United States Patent
Jeong et al.

(10) Patent No.: US 11,664,164 B2
(45) Date of Patent: May 30, 2023

(54) MULTILAYER ELECTRONIC COMPONENT

(71) Applicant: SAMSUNG ELECTRO-MECHANICS CO., LTD., Suwon-si (KR)

(72) Inventors: Eun Hee Jeong, Suwon-si (KR); Do Young Jeong, Suwon-si (KR); Dong Hwi Shin, Suwon-si (KR); Hyung Duk Yun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/379,456

(22) Filed: Jul. 19, 2021

(65) Prior Publication Data
US 2022/0165497 A1  May 26, 2022

(30) Foreign Application Priority Data
Nov. 24, 2020 (KR) .................... 10-2020-0158698

(51) Int. Cl.
*H01G 4/232* (2006.01)
*H01G 4/008* (2006.01)
*H01G 4/248* (2006.01)
*H01G 4/30* (2006.01)

(52) U.S. Cl.
CPC ............ *H01G 4/232* (2013.01); *H01G 4/008* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 10,354,802 B1 * | 7/2019 | Bae ..................... | H01G 2/065 |
| 11,217,391 B2 * | 1/2022 | Nagai .................. | H01G 4/005 |
| 2015/0115776 A1 * | 4/2015 | Terashita ............. | H01F 27/29 336/200 |
| 2016/0027583 A1 * | 1/2016 | Ahn ..................... | H01G 4/12 361/301.4 |

(Continued)

FOREIGN PATENT DOCUMENTS

| | | | | |
|---|---|---|---|---|
| JP | 2015-109410 A | | 6/2015 | |
| JP | 2022040762 A | * | 3/2022 | ............ H01G 4/008 |

(Continued)

*Primary Examiner* — Dion R. Ferguson
(74) *Attorney, Agent, or Firm* — Morgan, Lewis & Bockius LLP

(57) ABSTRACT

A multilayer electronic component includes: a body including dielectric layers and first and second internal electrodes; a first external electrode including a first electrode layer connected to the first internal electrodes, a first conductive resin layer on the first electrode layer, and a first plating layer on the first conductive resin layer, and including a first connection portion on a third surface of the body and a first band portion extending on first and second surfaces of the body; and a second external electrode connected to the second internal electrodes. L2-L1 is greater than 10 μm in which L1 is a distance from the third surface to a distal end of the first conductive resin layer in the first band portion, and L2 is a distance from the third surface to a distal end of the first plating layer in the first band portion.

20 Claims, 4 Drawing Sheets

(56) References Cited

U.S. PATENT DOCUMENTS

| | | | | |
|---|---|---|---|---|
| 2017/0294268 A1* | 10/2017 | Katsuta | ................ | H01G 4/232 |
| 2020/0075243 A1* | 3/2020 | Park | ................ | H01G 4/232 |
| 2020/0098523 A1* | 3/2020 | Shin | ................ | H01G 4/012 |
| 2020/0105472 A1* | 4/2020 | Song | ................ | H01G 4/012 |
| 2020/0211774 A1* | 7/2020 | Onodera | ................ | H01G 4/248 |
| 2020/0251283 A1* | 8/2020 | Onodera | ................ | H01G 4/248 |
| 2020/0312563 A1* | 10/2020 | Nagai | ................ | H01G 4/12 |
| 2020/0328028 A1* | 10/2020 | Maekawa | ................ | H01G 4/232 |
| 2020/0411245 A1* | 12/2020 | Lee | ................ | H01G 4/012 |
| 2021/0202172 A1* | 7/2021 | Kanzaki | ................ | H01G 4/008 |
| 2021/0217559 A1* | 7/2021 | Kim | ................ | H01G 2/065 |
| 2022/0165497 A1* | 5/2022 | Jeong | ................ | H01G 4/008 |
| 2022/0189704 A1* | 6/2022 | Aritomi | ................ | H01G 9/15 |

FOREIGN PATENT DOCUMENTS

| | | |
|---|---|---|
| KR | 10-2017-0116949 A | 10/2017 |
| KR | 10-2019-0121182 A | 10/2019 |

* cited by examiner

'P1'

MULTILAYER ELECTRONIC COMPONENT

CROSS-REFERENCE TO RELATED APPLICATION(S)

This application claims benefit of priority to Korean Patent Application No. 10-2020-0158698 filed on Nov. 24, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted.

In addition, a multilayer ceramic capacitor developed for an industrial electronic component is used in a harsh environment, and a multilayer ceramic capacitor disposed in a vehicle electronic control units (ECU) is used while exposed to a high-temperature and high-humidity environment.

Moisture resistance reliability of the multilayer ceramic capacitor may be deteriorated in the high-temperature and high-humidity environment. In addition, in the high-temperature and high-humidity environment, electrochemical migration in which crystals are formed in a dendrite shape through moisture absorption, decomposition, migration, and crystal growth of metals included in external electrodes may occur, such that a short-circuit failure may be liable to occur.

Therefore, the development of a method capable of ensuring reliability of the multilayer ceramic capacitor even in the high-temperature and high-humidity environment has been required.

SUMMARY

An aspect of the present disclosure may provide a multilayer electronic component of which moisture resistance reliability is improved.

Another aspect of the present disclosure may provide a multilayer electronic component in which electrochemical migration is suppressed.

According to an aspect of the present disclosure, a multilayer electronic component may include: a body including dielectric layers and first and second internal electrodes alternately disposed in a first direction with each of the dielectric layers interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first electrode layer connected to the first internal electrodes, a first conductive resin layer disposed on the first electrode layer, and a first plating layer disposed on the first conductive resin layer, and including a first connection portion disposed on the third surface and a first band portion extending from the first connection portion to portions of the first and second surfaces; and a second external electrode including a second electrode layer connected to the second internal electrodes, a second conductive resin layer disposed on the second electrode layer, and a second plating layer disposed on the second conductive resin layer, and including a second connection portion disposed on the fourth surface and a second band portion extending from the second connection portion to portions of the first and second surfaces. L2-L1 may be greater than 10 μm in which L1 is a distance from the third surface to a distal end of the first conductive resin layer in the first band portion, and L2 is a distance from the third surface to a distal end of the first plating layer in the first band portion.

According to an aspect of the present disclosure, a multilayer electronic component may include: a body including dielectric layers and first and second internal electrodes alternately disposed in a first direction with one of the dielectric layers interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first electrode layer connected to the first internal electrodes, a first conductive resin layer disposed on the first electrode layer, and a first plating layer disposed on the first conductive resin layer, and including a first connection portion disposed on the third surface and a first band portion extending from the first connection portion to portions of the first and second surfaces; and a second external electrode including a second electrode layer connected to the second internal electrodes, a second conductive resin layer disposed on the second electrode layer, and a second plating layer disposed on the second conductive resin layer, and including a second connection portion disposed on the fourth surface and a second band portion extending from the second connection portion to portions of the first and second surfaces. L3 may be 0.01 μm or more and 0.04 μm or less, in which L3 is a distance by which a distal end of the first plating layer and the body are spaced apart from each other in the first band portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
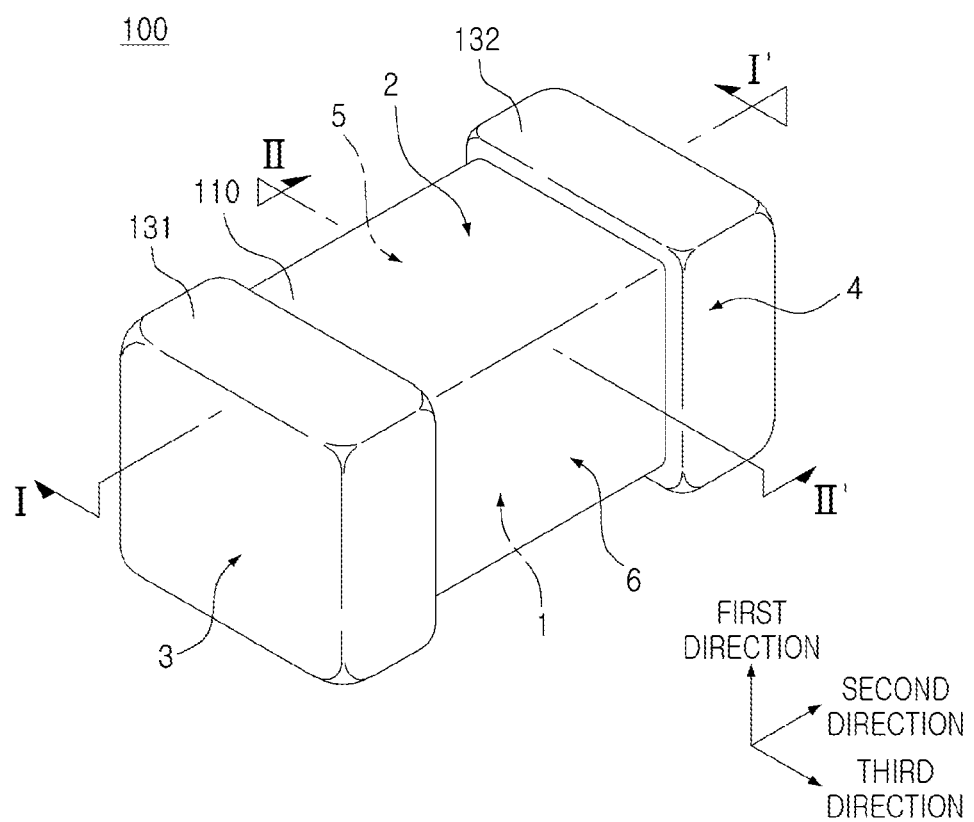
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may be defined as a stacked direction or a thickness T direction, a second direction may be defined as a length L direction, and a third direction may be defined as a width W direction.

Multilayer Electronic Component

FIG. 1 is a schematic perspective view illustrating a multilayer electronic component according to an exemplary embodiment in the present disclosure.

Figure 2:
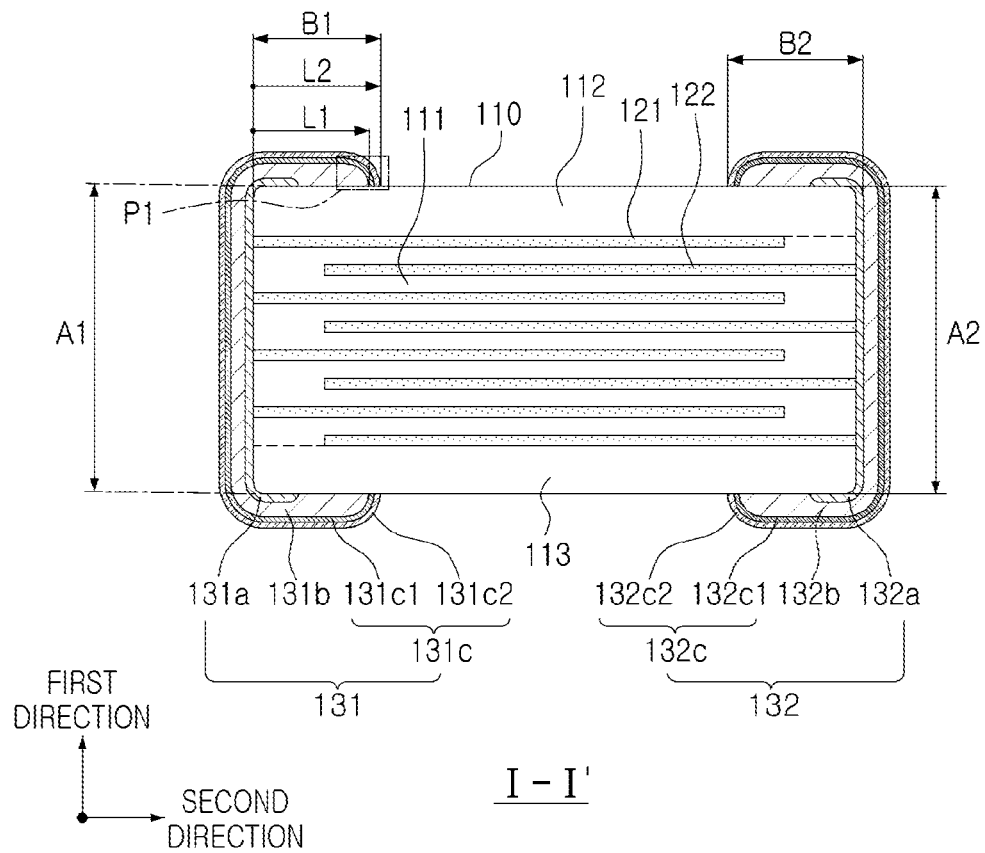
FIG. 2 is a cross-sectional view taken along line I-I' of FIG. 1.

FIG. 2 is a cross-sectional view taken along line I-I' of FIG. 1.

Figure 3:
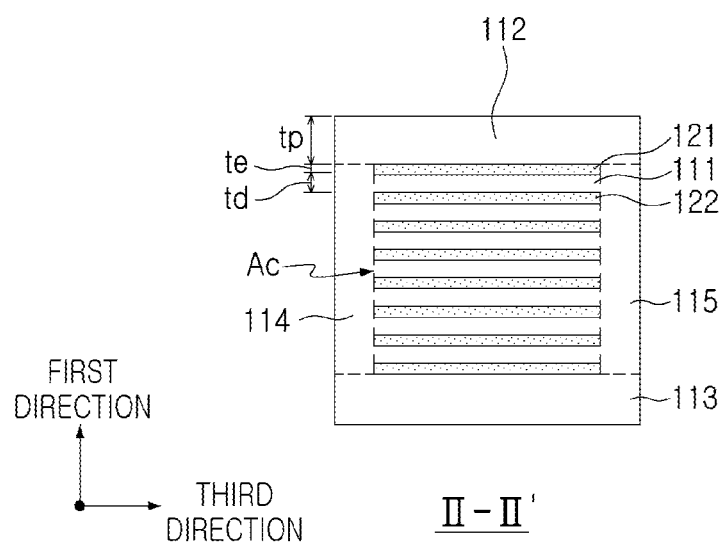
FIG. 3 is a cross-sectional view taken along line II-II' of FIG. 1.

FIG. 3 is a cross-sectional view taken along line II-II' of FIG. 1.

Figure 4:
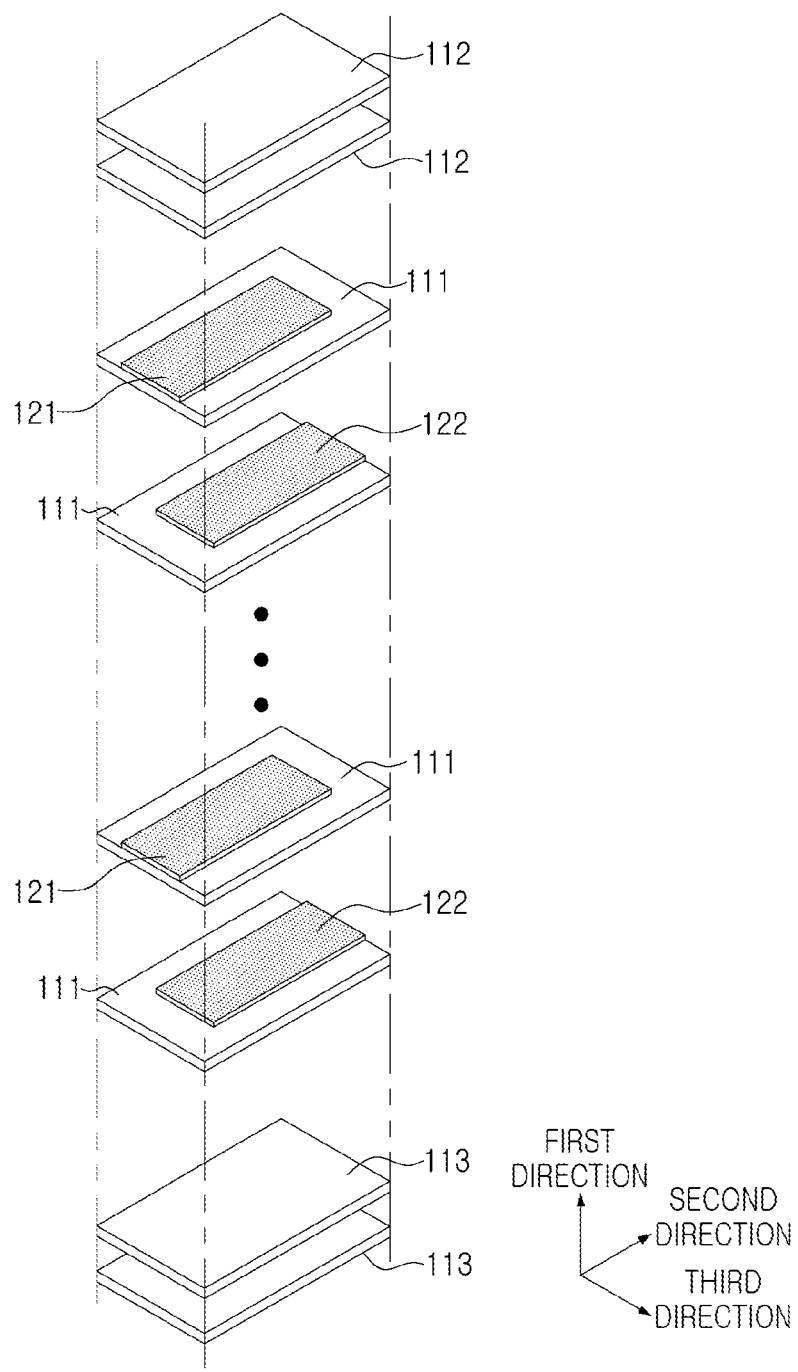
FIG. 4 is a schematic exploded perspective view illustrating a body in which dielectric layers and internal electrodes are stacked according to an exemplary embodiment in the present disclosure.

FIG. 4 is a schematic exploded perspective view illustrating a body in which dielectric layers and internal electrodes are stacked according to an exemplary embodiment in the present disclosure.

Figure 5:
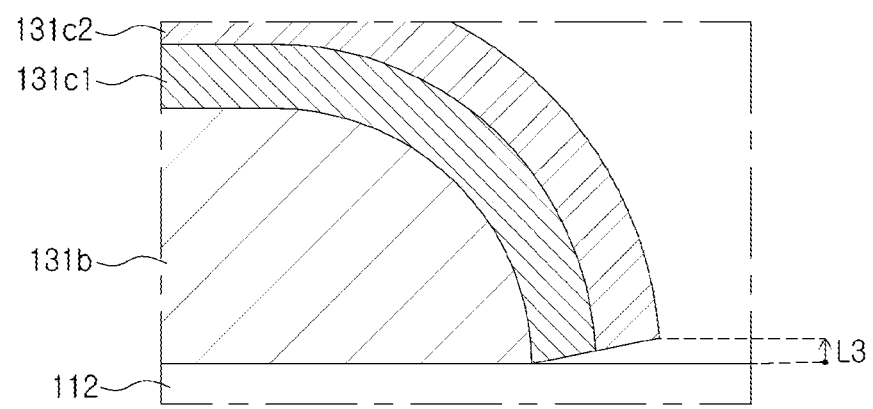
FIG. 5 is an enlarged view of region P1 of FIG. 2.

FIG. 5 is an enlarged view of region P1 of FIG. 2.

Hereinafter, a multilayer electronic component 100 according to an exemplary embodiment in the present disclosure will be described with reference to FIGS. 1 through 5.

The multilayer electronic component 100 according to an exemplary embodiment in the present disclosure may include: a body 110 including dielectric layers 111 and first and second internal electrodes 121 and 122 alternately disposed in the first direction with each of the dielectric layers 111 interposed therebetween, and having first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces and opposing each other in the third direction; a first external electrode 131 including a first electrode layer 131a connected to the first internal electrodes 121, a first conductive resin layer 131b disposed on the first electrode layer 131a, and a first plating layer 131c disposed on the first conductive resin layer 131b, and including a first connection portion A1 disposed on the third surface 3 and a first band portion B1 extending from the first connection portion A1 to portions of the first and second surfaces 1 and 2; and a second external electrode 132 including a second electrode layer 132a connected to the second internal electrodes 122, a second conductive resin layer 132b disposed on the second electrode layer 132a, and a second plating layer 132c disposed on the second conductive resin layer 132b, and including a second connection portion A2 disposed on the fourth surface and a second band portion B2 extending from the second connection portion A2 to portions of the first and second surfaces 1 and 2. L2-L1 may be greater than 10 μm in which L1 is a distance from the third surface 3 to a distal end of the first conductive resin layer 131b in the first band portion B1, and L2 is a distance from the third surface 3 to a distal end of the first plating layer 131c in the first band portion B1.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

A thickness td of the dielectric layer 111 does not need to be particularly limited, and may be determined in consideration of desired capacitance, a use environment and the like. For example, the thickness td of the dielectric layer 111 may be 0.45 μm or less in order to achieve miniaturization and an increase in capacitance of the multilayer electronic component.

The body 110 may include a capacitance forming portion Ac disposed in the body 110 and forming capacitance by including first internal electrodes 121 and second internal electrodes 122 disposed to face each other with each of the dielectric layers 111 interposed therebetween and cover portions 112 and 113 formed on upper and lower surfaces of the capacitance forming portion Ac in the first direction, respectively.

In addition, the capacitance forming portion Ac, which contributes to forming capacitance of the multilayer capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the capacitance forming portion Ac in the first direction and a lower cover part 113 disposed on the lower surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be 20 μm or less in order to more easily achieve the miniaturization and the increase in capacitance of the multilayer electronic component.

In addition, margin portions 114 and 115 may be disposed on side surfaces of the capacity forming portion A.

The margin portions 114 and 115 may include a margin portion 114 disposed on the fifth surface 5 of the body 110 and a margin portion 115 disposed on the sixth surface 6. That is, the margin portions 114 and 115 may be disposed on opposite side surfaces of the ceramic body 110 in the width direction.

The margin portions 114 and 115 refer to regions between both distal ends of the first and second internal electrodes 121 and 122 and boundary surfaces of the body 110 in a cross section of the body 110 cut in the width-thickness (W-T) direction, as illustrated in FIG. 3.

The margin portions 114 and 115 may basically serve to prevent damage to the internal electrodes due to physical or chemical stress.

The margin portions 114 and 115 may be formed by forming the internal electrodes by applying a conductive paste onto ceramic green sheets except for places where the margin portions are to be formed.

Alternatively, in order to suppress a step due to the internal electrodes 121 and 122, the margin portions 114 and 115 may be formed by stacking ceramic green sheets to form a laminate, cutting the laminate so that the internal electrodes are exposed to outer surfaces of the laminate, and then stacking a single dielectric layer or two or more dielectric layers on opposite side surfaces of the capacitance forming portion A in the width direction.

The internal electrodes 121 and 122 may be stacked alternately with the dielectric layer 111.

The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and be exposed through the third surface 3, and the second internal electrode 122 may be spaced apart from the third surface 3 and be exposed through the fourth surface 4. The first external electrode 131 may be disposed on the third surface 3 of the body and be connected to the first internal electrodes 121, and the second external electrode 132 may be disposed on the fourth surface 4 of the body and be connected to the second internal electrodes 122.

That is, the first internal electrodes 121 are not connected to the second external electrode 132, and may be connected to the first external electrode 131, and the second internal electrodes 122 are not connected to the first external electrode 131, and may be connected to the second external electrode 132. Therefore, the first internal electrodes 121 may be spaced apart from the fourth surface 4 by a predetermined distance, and the second internal electrodes 122 may be spaced apart from the third surface 3 by a predetermined distance.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for an internal electrode may be a screen-printing method, a gravure printing method or the like, but is not limited thereto.

A thickness to of each of the internal electrodes 121 and 122 does not need to be particularly limited, and may be determined in consideration of desired capacitance, a use environment and the like. For example, the thickness td of one of or each of the internal electrodes 121 and 122 may be 0.45 μm or less in order to achieve miniaturization and an increase in capacitance of the multilayer electronic component.

The external electrodes 131 and 132 are disposed on the third surface 3 and the fourth surface 4 of the body 110, respectively.

The external electrodes 131 and 132 may include the first and second external electrodes 131 and 132 disposed on the third and fourth surfaces 3 and 4 of the body 110, respectively, and connected to the first and second internal electrodes 121 and 122, respectively.

The first external electrode 131 may include the first electrode layer 131a, the first conductive resin layer 131b, and the first plating layer 131c, and the second external electrode 132 may include the second electrode layer 132a, the second conductive resin layer 132b, and the second plating layer 132c.

Dividing a region of the first external electrodes 131 according to disposition positions of the first external electrode 131 with reference to FIG. 2, the first external electrodes 131 may include the first connection portion A1 disposed on the third surface 3 of the body and the first band portion B1 extending from the first connection portion A1 to portions of the first and second surfaces 1 and 2. Although not labeled, the first external electrodes 131 may further include a corner portion connecting the first connection portion A1 and the first band portion B1 to each other.

Dividing a region of the second external electrode 132 according to disposition positions of the second external electrode 132, the second external electrodes 132 may include the second connection portion A2 disposed on the fourth surface 4 of the body and the second band portion B2 extending from the second connection portion A2 to portions of the first and second surfaces 1 and 2. Although not labeled, the second external electrodes 132 may further include a corner portion connecting the second connection portion A2 and the second band portion B2 to each other.

Since the plating layers 131c and 132c generally have a weak coupling force with the body 110, distal ends of the plating layers 131c and 132c in the band portions B1 and B2 may be spaced apart from the body 110, such that gaps may be formed. Such gaps may act as main moisture permeation paths to have a great influence on moisture resistance reliability. In addition, as the conductive resin layers 131b and 132b are exposed, electrochemical migration in which crystals are formed in a dendrite shape through moisture absorption, decomposition, migration, and crystal growth of metals included in the conductive resin layers may occur, such that a short-circuit failure may be liable to occur.

The plating layers 131c and 132c may be physically coupled to the body 110, and the larger the gaps formed in regions in which the plating layers 131c and 132c are physically coupled to the body 110, the easier the moisture permeation through the conductive resin layers 131b and 132b, such that a possibility that the moisture resistance reliability will be deteriorated may increase. The conductive resin layers 131b and 132b may have a moisture permeability lower than that of the electrode layers 131a and 131b, but may have a moisture absorption rate higher than that of the electrode layers 131a and 131b, and it may thus be difficult for the conductive resin layers 131b and 132b to prevent moisture permeation.

Therefore, in the present disclosure, a difference (L2-L1) between a length L1 of each of the conductive resin layers 131b and 132b and a length L2 of each of the plating layers 131c and 132c in the band portions B1 and B2 may be adjusted to improve a physical coupling force between the plating layers 131c and 132 and the body 110 and decrease the gaps between the distal ends of the plating layers 131c and 132c and the body 110, such that the exposure of the conductive resin layers 131b and 132b may be significantly reduced to improve the moisture resistance reliability. Hereinafter, a description will be provided mainly in relation to the first band portion B1, but may also be applied to the second band portion B2.

According to an exemplary embodiment in the present disclosure, L2-L1 may be greater than 10 μm in which L1 is a distance from the third surface 3 to the distal end of the first conductive resin layer 131b in the first band portion B1, and L2 is a distance from the third surface 3 to the distal end of the first plating layer 131c in the first band portion B1.

When L2-L1 is 10 μm or less, the gap between the distal end of the first plating layer 131c and the body 110 may become large, and moisture permeation may thus be facilitated, such that the moisture resistance reliability may be deteriorated.

In this case, the distance L2 from the third surface to the distal end of the first plating layer 131c in the first band portion B1 may be greater than the distance L1 from the third surface to the distal end of the first conductive resin layer 131b in the first band portion B1, and the first plating layer 131c may thus be disposed to cover the first conductive resin layer 131b. In addition, the first conductive resin layer 131b may be disposed to cover the first electrode layer 131a to prevent permeation of a plating solution at the time of forming the plating layer 131c, thereby improving reliability in moisture resistance.

Therefore, according to an exemplary embodiment in the present disclosure, in the first band portion B1, the first conductive resin layer 131b may be disposed to cover the first electrode layer 131a, and the first plating layer 131c may be disposed to cover the first conductive resin layer 131b.

In addition, as illustrated in FIGS. 1 and 2, L1 and L2 may be measured in a cross section (an L-T cross section) of the multilayer electronic component 100 cut in the first and second directions at the center of the multilayer electronic component 100 in the third direction. In one example, an optical microscope or a scanning electron microscope (SEM) may be used in the measurement, although the present disclosure is not limited thereto. Other methods and/or tools appreciated by one of ordinary skill in the art, even if not described in the present disclosure, may also be used.

Meanwhile, a size of the multilayer electronic component 100 need not be particularly limited.

However, as the size of the multilayer electronic component 100 decreases, a physical contact area between the plating layers 131c and 132c and the body 110 may decrease, and the moisture permeation may become easier, such that the moisture resistance reliability may be deteriorated.

Therefore, the moisture resistance reliability may be further improved by controlling L2-L1 more precisely in consideration of the size of the multilayer electronic component 100.

In an exemplary embodiment, the multilayer electronic component 100 may have a size of 2.2 mm or less in the second direction and a size of 1.32 mm or less in the third direction, and L2-L1 may be 20 μm or more and 30 μm or less.

In general, as the size of the multilayer electronic component 100 decreases, the physical contact area between the plating layers 131c and 132c and the body 110 may decrease, and the moisture permeation may become easier, and moisture resistance reliability may be deteriorated particularly in a multilayer electronic component 100 having a size of 2012 (length×width: 2.0 mm×1.2 mm) or less.

Therefore, considering a manufacturing error, sizes of external electrodes, and the like, when a length of the multilayer electronic component 100 is 2.2 mm or less and a width of the multilayer electronic component is 1.32 mm or less, moisture resistance reliability may be deteriorated. Here, the length of the multilayer electronic component 100 may refer to the size of the multilayer electronic component 100 in the second direction, and the width of the multilayer electronic component 100 may refer to the size of the multilayer electronic component 100 in the third direction.

On the other hand, according to an exemplary embodiment in the present disclosure, even when the size of the multilayer electronic component 100 in the second direction is 2.2 mm or less and the size of the multilayer electronic component 100 in the third direction is 1.32 mm or less, L2-L1 may be controlled to be 20 μm or more and 30 μm or less to improve the moisture resistance reliability and suppress a short circuit between the external electrodes, an arc discharge and the like. When L2-L1 is smaller than 20 μm, the improvement in the moisture resistance reliability in a small size may be insufficient, and when L2-L1 exceeds 30 μm, a short circuit between the external electrodes, the arc discharge and the like may occur.

In an exemplary embodiment, the multilayer electronic component 100 may have a size greater than 2.2 mm in the second direction and a size greater than 1.32 mm in the third direction.

As the size of the multilayer electronic component 100 becomes large, the physical contact area between the plating layers 131c and 132c and the body 110 may increase, so that the moisture permeation may become difficult. However, even though the physical contact area between the plating layers 131c and 132c and the body 110 increases, when L2-L1 is 10 µm or less, the gap between the distal end of the first plating layer 131c and the body may become large, and the moisture permeation may thus become easy, such that the moisture resistance reliability may be deteriorated. Therefore, it may be preferable that L2-L1 is greater than 10 µm, and it may be more preferable that L2-L1 is 20 µm or more in order to further suppress the electrochemical migration.

Meanwhile, an upper limit of L2-L1 does not need to be particularly limited, and may be set according to required specifications.

In an exemplary embodiment, L3 may be 0.04 µm or less in which L3 is a distance by which the distal end of the first plating layer and the body are spaced apart from each other in the first band portion. That is, a gap between the first band portion and the body may be 0.04 µm or less.

When L3 is greater 0.04 µm, a passage through which moisture may permeate becomes wide, and moisture resistance reliability may thus be deteriorated. In this case, a lower limit of L3 does not need to be particularly limited. However, considering analysis noise or the like at the time of analysis for L3 measurement, L3 may be 0.01 µm or more.

Meanwhile, the first and second electrode layers 131a and 132a may be formed of any material having electrical conductivity, such as a metal, and a specific material of each of the first and second electrode layers 131a and 132a may be determined in consideration of electrical characteristics, structural stability and the like.

For example, the first and second electrode layers 131a and 132a may include a conductive metal and glass.

The conductive metal used for the electrode layers 131a and 132a is not particularly limited as long as it is any material that may be electrically connected to the internal electrodes in order to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying and then sintering a conductive paste prepared by adding glass frit to conductive metal powder particles.

Alternatively, the first and second electrode layers 131a and 132a may be formed by, for example, an atomic layer deposition (ALD) method, a molecular layer deposition (MLD) method, a chemical vapor deposition (CVD) method, a sputtering method, or the like.

Alternatively, the first and second electrode layers 131a and 132a may be formed in a manner of transferring a sheet including a conductive metal onto the body 110.

The conductive resin layers 131b and 132b may include a conductive metal and a base resin.

The conductive metal included in the conductive resin layers 131b and 132b may serve to be electrically connected to the electrode layers 131a and 132a.

The conductive metal used for the conductive resin layers 131b and 132b is not particularly limited as long as it is any material that may be electrically connected to the electrode layers 131a and 132a, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the conductive resin layers 131b and 132b may include one or more of spherical powder particles and flake-shaped powder particles. That is, the conductive metal may include only the flake-shaped powder particles, may include only the spherical powder particles, and may have a form in which the flake-shaped powder particles and the spherical powder particles are mixed with each other.

Here, the spherical powder particles may include a form that is not completely spherical, and may include, for example, a form in which a length ratio (major axis/minor axis) of a major axis to a minor axis is 1.45 or less.

The flake-shaped powder refers to a powder having a flat and elongated shape, and is not particularly limited, and, for example, a length ratio (major axis/minor axis) of a major axis to a minor axis may be 1.95 or more.

Lengths of the major axes and the minor axes of the spherical powder and the flake-shape type powder may be measured from an image obtained by scanning a cross section (an LT cross section) of the multilayer electronic component in the first and third directions cut at the center of the multilayer electronic component in the third direction with an SEM.

The base resin included in the conductive resin layers 131b and 132b may serve to secure a bonding property and absorb shocks.

A base resin included in the conductive resin layers 131b and 132b is not particularly limited as long as it is any resin that has a bonding property and a shock absorbing property and may be mixed with conductive metal powder particles to form a paste, and may include, for example, an epoxy-based resin.

In addition, the conductive resin layers 131b and 132b may include a plurality of metal particles, an intermetallic compound, and a base resin.

The intermetallic compound may serve to connect the plurality of metal particles to each other to improve electrical connectivity, and may further serve to surround the plurality of metal particles to connect the plurality of metal particles to each other.

In this case, the intermetallic compound may include a metal having a melting point lower than a hardening temperature of the base resin.

That is, since the intermetallic compound includes the metal having the melting point lower than the hardening temperature of the base resin, the metal having the melting point lower than the hardening temperature of the base resin may be melted during drying and curing processes, and may form an intermetallic compound with some of the metal particles to surround the metal particles. Here, the intermetallic compound may preferably include a low melting point metal of 300° C. or less.

For example, the intermetallic compound may include Sn having a melting point of 213 to 220° C. Sn may be melted during the drying and curing processes, and the molten Sn may wet metal particles having a high melting point, such as Ag, Ni, or Cu by a capillary phenomenon and react with some of Ag, Ni or Cu metal particles to form an intermetallic compounds such as $Ag_3Sn$, $Ni_3Sn_4$, $Cu_6Sn_5$, or $Cu_3Sn$. Ag, Ni, or Cu that did not participate in the reaction may remain in a form of metal particles.

Therefore, the plurality of metal particles may include one or more of Ag, Ni, and Cu particles, and the intermetallic compound may include one or more of $Ag_3Sn$, $Ni_3Sn_4$, $Cu_6Sn_5$, and $Cu_3Sn$.

Meanwhile, as the conductive resin layers 131b and 132b are exposed, electrochemical migration in which crystals are formed in a dendrite shape through moisture absorption, decomposition, migration, and crystal growth of metals included in the conductive resin layers 131b and 132b in a high-temperature and high-humidity environment may occur, such that a short-circuit failure may be liable to occur. In particular, when Ag is included in the conductive resin layers 131b and 132b, the electrochemical migration may be liable to occur.

According to an exemplary embodiment in the present disclosure, the difference (L2-L1) between the length L1 of each of the conductive resin layers 131b and 132b and the length L2 of each of the plating layers 131c and 132c in the band portions B1 and B2 may be adjusted to improve the physical coupling force between the plating layers 131c and 132 and the body 110 and decrease the gaps between the distal ends of the plating layers 131c and 132c and the body 110, such that the exposure of the conductive resin layers 131b and 132b may be significantly reduced to effectively suppress the electrochemical migration. Therefore, when the conductive resin layers 131b and 132b include Ag, an effect of suppressing the electrochemical migration according to the present disclosure may be more remarkable.

Meanwhile, the plating layers 131c and 132c may basically serve to improve mounting characteristics of the multilayer electronic component. A type of the plating layers 131c and 132c is not particularly limited. That is, each of the plating layers 131c and 132c may be a plating layer including one or more of Ni, Sn, Pd, and alloys thereof, and may be formed as a plurality of layers.

As a more specific example of the plating layers 131c and 132c, the plating layers 131c and 132c may be Ni plating layers or Sn plating layers, and may have a form in which Ni plating layers 131c1 and 132c1 and Sn plating layers 131c2 and 132c2 are sequentially formed on the conductive resin layers 131b and 132b, respectively. However, the plating layers 131c and 132c are not limited thereto, and may have a form in which Sn plating layers, Ni plating layers, and Sn plating layers are sequentially formed or may include a plurality of Ni plating layers and/or a plurality of Sn plating layers.

(Inventive Example)

Sample chips in a which a length L1 of a conductive resin layer and a length L2 of a plating layer L2 in a band portion B1 have values shown in Table 1 were prepared. L3 and moisture resistance reliability of the sample chips, and whether or not electrochemical migration has occurred in the sample chips were evaluated and measured, and are illustrated in Table 1.

Sizes in Table 1 mean that lengths and widths of the sample chips are 1608 (length×width: 1.6 mm×0.8 mm), 2012 (length×width: 2.0 mm×1.2 mm), 3216 (length×width: 3.2 mm×1.6 mm), and 3225 (length×width: 3.2 mm×2.5 mm).

In Table 1, L1 is a distance from a third surface to a distal end of a first conductive resin layer 131b in the first band portion B1, L2 is a distance from the third surface to a distal end of a first plating layer 131c in the first band portion B1, and L3 is a distance by which the distal end of the first plating layer and a body are spaced apart from each other. L1, L2, and L3 were measured from images obtained by scanning cross-sections (L-T cross-sections) of the sample chips cut in first and second directions at the center of the sample chips in a third direction with an SEM.

In electrochemical migration of Table 1, the numbers of sample chips in which Ag having a dendrite shape exists as a result of preparing hundred sample chips per Test No. and then analyzing components of a gap between the distal end of the first plating layer and a dielectric were shown.

In moisture resistance reliability of Table 1, the numbers of sample chips in which an insulating resistance value is decreased to $\frac{1}{10}$ or less of an initial numerical value as a result of preparing 400 sample chips per Test No. and then applying a voltage of 4V to 400 sample chips for twelve hours at a temperature of 85° C. and a relative humidity of 85% were shown.

TABLE 1

| Test No. | Size | L1 (μm) | L2 (μm) | L2-L1 (μm) | L3 (μm) | Moisture Resistance Reliability | Electrochemical Migration |
|---|---|---|---|---|---|---|---|
| 1 | 1608 | 375 | 375 | 0 | 0.1 | 20/400 | 20/100 |
| 2 |  | 375 | 380 | 5 | 0.08 | 10/400 | 10/100 |
| 3 |  | 375 | 385 | 10 | 0.06 | 5/400 | 5/100 |
| 4 |  | 375 | 395 | 20 | 0.04 | 0/400 | 0/100 |
| 5 |  | 375 | 405 | 30 | 0.02 | 0/400 | 0/100 |
| 6 | 2012 | 525 | 525 | 0 | 0.1 | 20/400 | 20/100 |
| 7 |  | 525 | 530 | 5 | 0.08 | 10/400 | 10/100 |
| 8 |  | 525 | 535 | 10 | 0.06 | 5/400 | 5/100 |
| 9 |  | 525 | 545 | 20 | 0.04 | 0/400 | 0/100 |
| 10 |  | 525 | 555 | 30 | 0.02 | 0/400 | 0/100 |
| 11 | 3216 | 650 | 650 | 0 | 0.1 | 23/400 | 20/100 |
| 12 |  | 650 | 655 | 5 | 0.08 | 16/400 | 10/100 |
| 13 |  | 650 | 660 | 10 | 0.06 | 1/400 | 5/100 |
| 14 |  | 650 | 665 | 15 | 0.04 | 0/400 | 3/100 |
| 15 |  | 650 | 670 | 20 | 0.02 | 0/400 | 0/100 |
| 16 | 3225 | 825 | 825 | 0 | 0.1 | 23/400 | 20/100 |
| 17 |  | 825 | 830 | 5 | 0.08 | 16/400 | 10/100 |
| 18 |  | 825 | 835 | 10 | 0.06 | 1/400 | 5/100 |
| 19 |  | 825 | 840 | 15 | 0.04 | 0/400 | 2/100 |
| 20 |  | 825 | 845 | 20 | 0.02 | 0/400 | 0/100 |

In Test Nos. 4, 5, 9, 10, 14, 15, 19, and 20 in which L2-L1 is greater than 10 μm, it may be confirmed in which moisture resistance reliability is excellent because there is no sample chip determined to be defective in a moisture resistance reliability evaluation.

On the other hand, in Test Nos. 1 to 3, 6 to 8, 11 to 13, and 16 to 18 in which L2-L1 is 10 μm or less, it may be confirmed that moisture resistance reliability is poor.

In addition, it may be confirmed that as L2-L1 increases, the distance (L3) by which the distal end of the first plating layer and the body are spaced apart from each other gradually decreases, moisture resistance reliability is improved, and electrochemical migration is suppressed.

As set forth above, according to an exemplary embodiment in the present disclosure, the moisture resistance reliability may be improved by adjusting a difference between lengths of the conductive resin layer and the plating layer in one band portion.

In addition, the gap between the plating layer and the body in one band portion may be significantly reduced.

Further, the electrochemical migration may be suppressed.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
   a body including dielectric layers and first and second internal electrodes alternately disposed in a first direction with one of the dielectric layers interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode including a first electrode layer connected to the first internal electrodes, a first conductive resin layer disposed on the first electrode layer, and a first plating layer disposed on the first conductive resin layer, and including a first connection portion disposed on the third surface and a first band portion extending from the first connection portion to portions of the first and second surfaces; and a second external electrode including a second electrode layer connected to the second internal electrodes, a second conductive resin layer disposed on the second electrode layer, and a second plating layer disposed on the second conductive resin layer, and including a second connection portion disposed on the fourth surface and a second band portion extending from the second connection portion to portions of the first and second surfaces, wherein L2-L1 is greater than 20 μm in which L1 is a distance from the third surface to a distal end of the first conductive resin layer in the first band portion, and L2 is a distance from the third surface to a distal end of the first plating layer in the first band portion.

2. The multilayer electronic component of claim 1, wherein the multilayer electronic component has a size of 2.2 mm or less in the second direction and a size of 1.32 mm or less in the third direction, and L2-L1 is 30 μm or less.

3. The multilayer electronic component of claim 1, wherein the multilayer electronic component has a size greater than 2.2 mm in the second direction and a size greater than 1.32 mm in the third direction.

4. The multilayer electronic component of claim 1, wherein L3 is 0.04 μm or less in which L3 is a distance by which the distal end of the first plating layer and the body are spaced apart from each other in the first band portion.

5. The multilayer electronic component of claim 4, wherein L3 is 0.01 μm or more and 0.04 μm or less.

6. The multilayer electronic component of claim 1, wherein in the first band portion, the first conductive resin layer is disposed to cover the first electrode layer, and the first plating layer is disposed to cover the first conductive resin layer.

7. The multilayer electronic component of claim 1, wherein L1 and L2 are determined in a cross section of the multilayer electronic component cut in the first and second directions at a center of the multilayer electronic component in the third direction.

8. The multilayer electronic component of claim 1, wherein the first and second electrode layers include glass and a conductive metal.

9. The multilayer electronic component of claim 1, wherein the first and second conductive resin layers include a conductive metal and a base resin.

10. The multilayer electronic component of claim 9, wherein the conductive metal includes Ag.

11. The multilayer electronic component of claim 1, wherein each of the first and second plating layers includes a Ni plating layer and a Sn plating layer disposed on the Ni plating layer.

12. The multilayer electronic component of claim 1, wherein a thickness of one of the dielectric layers is 0.45 μm or less.

13. The multilayer electronic component of claim 1, wherein a thickness of one of the first and second internal electrodes is 0.45 μm or less.

14. A multilayer electronic component comprising:

a body including dielectric layers and first and second internal electrodes alternately disposed in a first direction with one of the dielectric layers interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode including a first electrode layer connected to the first internal electrodes, a first conductive resin layer disposed on the first electrode layer, and a first plating layer disposed on the first conductive resin layer, and including a first connection portion disposed on the third surface and a first band portion extending from the first connection portion to portions of the first and second surfaces; and a second external electrode including a second electrode layer connected to the second internal electrodes, a second conductive resin layer disposed on the second electrode layer, and a second plating layer disposed on the second conductive resin layer, and including a second connection portion disposed on the fourth surface and a second band portion extending from the second connection portion to portions of the first and second surfaces, wherein L3 is 0.01 μm or more and 0.04 μm or less, in which L3 is a distance by which a distal end of the first plating layer and the body are spaced apart from each other in the first band portion.

15. The multilayer electronic component of claim 14, wherein in the first band portion, the first conductive resin layer is disposed to cover the first electrode layer, and the first plating layer is disposed to cover the first conductive resin layer.

16. The multilayer electronic component of claim 14, wherein L3 is determined in a cross section of the multilayer electronic component cut in the first and second directions at a center of the multilayer electronic component in the third direction.

17. The multilayer electronic component of claim 14, wherein the first and second electrode layers include glass and a conductive metal.

18. The multilayer electronic component of claim 14, wherein the first and second conductive resin layers include a conductive metal and a base resin.

19. The multilayer electronic component of claim 18, wherein the conductive metal includes Ag.

20. The multilayer electronic component of claim 14, wherein each of the first and second plating layers includes a Ni plating layer and a Sn plating layer disposed on the Ni plating layer.

* * * * *